United States Patent [19]

Osborn

[11] 4,168,023
[45] Sep. 18, 1979

[54] VEHICLE LUGGAGE RACK

[76] Inventor: Jack R. Osborn, Rte. 2, Box 487-H, Goldsboro, N.C. 27530

[21] Appl. No.: 887,665

[22] Filed: Mar. 17, 1978

[51] Int. Cl.² ............................................. B60R 9/04
[52] U.S. Cl. ...................................... 224/325; 108/44
[58] Field of Search ....... 224/29 R, 42.03 R, 42.03 A, 224/42.07, 42.08, 42.1 R, 42.1 E, 42.1 F, 42.1 H, 42.45 R, 42.1 G, 42.03 B; 108/44, 45, 46; 214/450

[56] References Cited

U.S. PATENT DOCUMENTS

| | | | |
|---|---|---|---|
| 2,835,543 | 5/1958 | Maixner | 108/46 |
| 2,895,628 | 7/1959 | Gebhart | 224/42.03 R X |
| 3,709,413 | 1/1973 | Nelson | 224/29 R X |
| 3,896,742 | 7/1975 | Ferraro | 108/44 |
| 3,912,139 | 10/1975 | Bowman | 224/42.45 R X |

FOREIGN PATENT DOCUMENTS

1228141 4/1971 United Kingdom ............... 224/42.1 E

Primary Examiner—Trygve M. Blix
Assistant Examiner—Winston H. Douglas
Attorney, Agent, or Firm—Mills & Coats

[57] ABSTRACT

The present invention relates to a vehicle luggage rack adapted to be mounted atop a vehicle of the type having a landau roof. The luggage rack comprises a main luggage rack frame secured about the front of the vehicle roof, and including a longitudinal adjustable rear extension extending rearwardly past the vehicle roof. A rear vertically adjustable support assembly is fixed to the rear extension and depends rearwardly therefrom for engagement with a rear portion of the vehicle body referred to as the trunk area. This allows the entire luggage rack of the present invention to extend over the roof and to be supported about the front of the vehicle roof and about the trunk area of the vehicle.

8 Claims, 3 Drawing Figures

VEHICLE LUGGAGE RACK

The present invention relates to luggage racks, and more particularly to a luggage rack of the type adapted to be mounted atop the roof of a vehicle.

BACKGROUND OF INVENTION

In recent years the landau type roof has become quite popular as a styling feature of American made automobiles. Typically, the landau roof style imparts a divided or two sectional roof appearance. In traditional American automobile styling the landau roof is made up of a front metal roof section, and an adjacent rear vinyl roof section.

While the landau roof is desirable from a styling consideration, it does have practical draw backs and limitations. In this regard, many people still desire to use a roof mounted luggage rack on their vehicle from time to time, but generally such roof mounted luggage racks are not compatible with a landau roof. In particularly, the attaching means of a roof mounted luggage rack is generally comprised of a series of suction cups that are designed to engage the roof of the vehicle. Such suction cups are not always effective in creating a secure suction attachment with vinyl or resilient surfaces. In addition, with a landau roof, the vinyl material comprising a part thereof is not as rugged and durable as a conventional metal roof, and consequently is more prone to tear, rip and other forms of damage than a conventional metal roof construction. Thus, in the end it can be stated that for the most part conventional roof mounted luggage racks are unsuitable for use in conjunction with vehicles having a landau roof.

SUMMARY OF INVENTION

The present invention entails a luggage rack particularly adapted for use in conjunction with a vehicle having a landau roof. In particularly, the luggage rack of the present invention comprises a luggage rack frame that is adapted for conventional mounting about the front metal portion of the vehicle landau roof. The luggage rack frame extends rearwardly over a vinyl rear section of the landau roof and includes a rear extension that projects rearwardly from the rear of the vehicle roof over the trunk or rear body portions of the vehicle. Depending downwardly from the rear extension of the luggage rack is a vertically adjustable support post that is adapted to engage the trunk cover or trunk lid of the vehicle for supporting the luggage rack rearwardly of the roof. Thus the luggage rack of the present invention spans over the rear vinyl roof portion of the vehicle and is supported independently thereof as the luggage rack is supported about the front metal portion of the roof and by the rear vertical post that engages the trunk lid of the vehicle.

It is, therefore, an object of the present invention to provide a vehicle mounted luggage rack that is suitable for use in conjunction with a vehicle having a landau roof.

A further object of the present invention is to provide a vehicle mounted luggage rack that is adapted to span the entire rear vinyl roof area of a landau roof and which is adapted to be supported independently of the rear vinyl area of said landau roof.

Still a further object of the present invention is to provide a vehicle mounted luggage rack that is adapted to be rearwardly supported by portions of the vehicle body rearwardly of the roof.

More particularly, a further object of the present invention resides in the provision of a vehicle mounted luggage rack that is adapted to be supported about the rear thereof by the upper vehicle body area generally overlying the trunk area of the vehicle.

Another object of the present invention is to provide a vehicle mounted luggage rack for a vehicle having a landau roof wherein the luggage rack is provided with means for adjusting the same to fit various makes and models of vehicles, particularly vehicles having a landau style roof.

Still a further object of the present invention is to provide a luggage rack design of the type adapted to be mounted on a vehicle wherein the luggage rack design assures a stable and rigid connection to the vehicle.

Another object of the present invention is to provide a luggage rack design of the type adapted to be mounted above the roof of a vehicle without direct support about the intermediate and rear areas of the roof, but which is supported about the front of the roof and about the rear trunk lid area of the vehicle.

Other objects and advantages of the present invention will become apparent from a study of the following description and the accompanying drawings which are merely illustrative of the present invention.

DESCRIPTION OF PREFERRED EMBODIMENT

Figure 1:
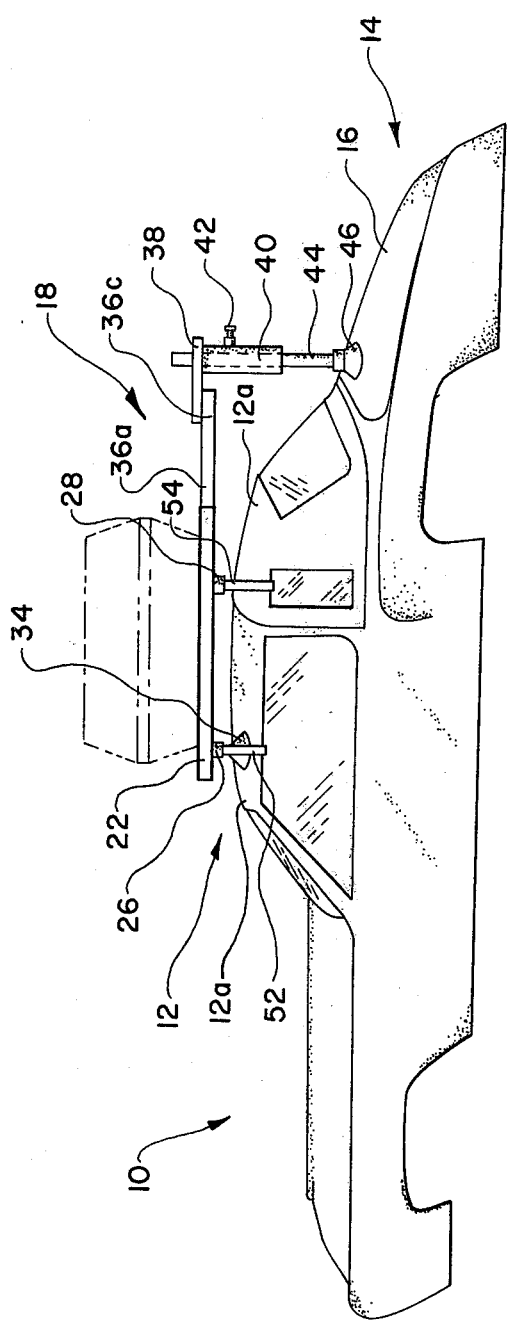
FIG. 1 is a side elevational view of a vehicle having a landau style roof with the luggage rack of the present invention mounted thereon.

With further reference to the drawings, a vehicle is shown therein and indicated generally by the numeral 10. Vehicle 10 is of the type having a landau style roof 12 including a front metal section 12a and a rear vinyl roof section 12b. Vehicle 10, as illustrated in FIG. 1, includes a rear body or trunk area 14, with the trunk area being enclosed by a trunk cover or trunk lid 16.

The present invention relates to a luggage rack, indicated generally by the numeral 18, that is particularly adapted to be mounted above the roof 12 of vehicle 10. Viewing luggage rack 18 in detail, it is seen that the same comprises a pair of laterally spaced longitudinally extending runners 22 and 24, each runner in the preferred embodiment being of a generally hollow tubular box construction. Secured by weldment or other suitable means to runners 22 and 24 is a pair of longitudinally spaced, transversely extending cross members 26 and 28.

Secured to the underside of front cross member 26 is a pair of downwardly depending legs 30. Fitted to the lower end of each leg 30 is a suction cup referred to by numerals 32 and 34. Suction cups 32 and 34 form a part of the front attaching means of the luggage rack 18 and act to attach the luggage rack 18 to the front roof area 12a. The suction cups 32 and 34 perform in known and conventional manner to suctionally engage the upper surface of the front metal area 12a of the vehicle roof.

Figure 2:
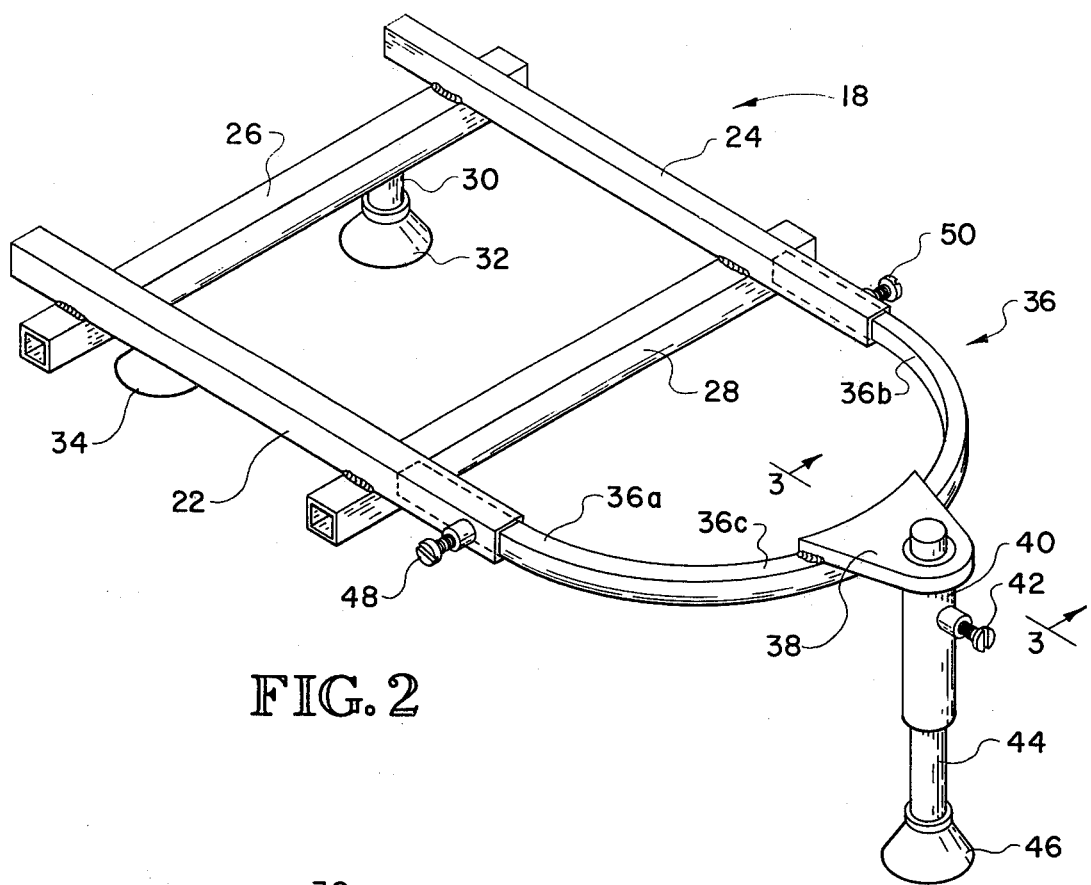
FIG. 2 is a perspective view of the luggage rack of the present invention.
Figure 3:
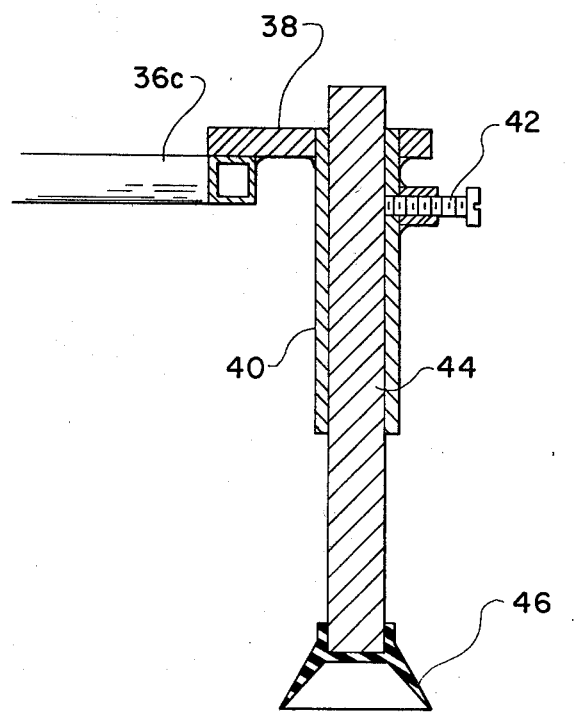
FIG. 3 is a fragmentary sectional view taken along the lines 3—3 of FIG. 2.

Continuing to refer to the luggage rack frame 20, it is seen that about the rear thereof is provided a longitudinally adjustable rear extension, indicated generally by the numeral 36. Rear extension 36 includes a pair of leg portions 36a and 36b adapted to be received within the rear hollow portions of runners 22 and 24. Leg portions 36a and 36b are adjustably and securely held within runners 22 and 24 by a pair of set screws 48 and 50, as illustrated in FIG. 2.

Extending between the leg portions 36a and 36b is an arcuate shaped end portion 36c which supports a clevis 38 secured thereto.

Fixed to clevis 38 and depending downwardly therefrom is a generally vertically oriented hollow collar 40. Collar 40 is adapted to receive a vertically adjustable support post 44 that is movable vertically up and down within collar 40 and adapted to be secured in a desired adjusted position by a set screw 42 threadingly secured within the wall structure of collar 40.

Disposed about the lower end of support post 44 is a suction cup 46 that is adapted to engage an upper surface area portion of the trunk lid or trunk cover 16 of the vehicle and to generally support the luggage rack 18 about a rear point.

Therefore, it is appreciated that the luggage rack 18 of the present invention is adapted to be supported about the front by suction cups 32 and 34, through legs 30, and about the rear by vertical support post 44 and the suction cup 46 secured about the lower end thereof. Additional stability is added by the provision of conventional front attachment straps 52 that interconnected the luggage rack 18 with front side portions of the vehicle roof 12, and by conventional intermediate straps 54 connected between the luggage rack 18 and a rear to intermediate area of the roof 12. As illustrated in FIG. 1, the intermediate straps 54, when rack 18 is mounted on vehicle 10, are disposed in the area of the rear side opera windows of the vehicle and are preferably adapted to attach about the upper outer molding area thereof.

In use, the luggage rack 18 of the present invention is adapted to be used in conjuction with a vehicle of the type shown in FIG. 1 and particularly is designed to be used in conjunction with a vehicle having a landau roof. As illustrated in FIG. 1, luggage rack 18 when properly mounted above roof 12 spans over the rear vinyl area 12b of the landau roof and is not directly supported thereover by suction cups or the like. Instead, support is provided by suction cups 32 and 34 through legs 30 about the front of the roof, and by support post 44 and suction cup 46 which is adapted to engage an area of the vehicle disposed rearwardly of the roof, such as the trunk cover or lid 16 of the vehicle 10 as shown in FIG. 1.

Attention now is directed to rear extension 36 of the luggage rack frame. It is appreciated that by adjusting set screws 48 and 50 that the rear extension 36 can be adjusted longitudinally in order that support post 44 can be directed to an appropriate support area about the rear of the vehicle 10. This allows the luggage rack 18 to have flexibility in being able to fit various makes and models of vehicles. In mounting the luggage rack 18 on a particular vehicle, rear extension 36 can be adjusted fore-and-aftly within runners 22 and 24 until the appropriate span between the front suction cups 32 and 34 and rear suction cup 44 is reached. After the appropriate span has been realized, then the respective suction cups 32, 34 and 46 are pressed into suction engagement with the underlying vehicle body. Stability is added by appropriately connecting the front and intermediate straps 52 and 54.

It is, therefore, appreciated that by adjusting the span between the front suction cups 32 and 34, and the rear suction cup 46, that the effective capacity of the luggage rack 18 is increased due to the rear extension portion 36 of the luggage rack frame structure that extends from the roof over the rear body area of the vehicle. This increased capacity, of course, allows the vehicle luggage rack to carry a greater load.

From the foregoing specification and discussion of the present invention, it is seen that the present invention presents a luggage rack design that is particularly adapted for use in conjunction with vehicles having a landau style roof. More particularly, the design enables the entire luggage rack to be supported without direct support from the luggage rack to the rear vinyl landau area 12b of the roof. In addition, it is appreciated that the luggage rack 18 of the present invention presents a simple, relatively inexpensive design, that when attached to the vehicle forms a sturdy and rigid luggage rack with a relatively large load carrying capacity.

The terms "upper", "lower", "forward", "rearward", etc., have been used herein merely for the convenience of the foregoing specification and in the appended claims to describe the vehicle luggage rack and its parts as oriented in the drawings. It is to be understood, however, that these terms are in no way limiting to the invention since the vehicle luggage rack may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range of the appended Claims are intended to be embraced herein.

What is claimed is:

1. A vehicle luggage rack adapted to fit and be supported about the roof of a vehicle and to be at least partially supported at the rear of the vehicle roof, independently of the roof, by the vehicle trunk lid; said luggage rack comprising: a main luggage rack frame for receiving and supporting luggage and including a pair of laterally spaced longitudinal extending runners with at least two longitudinally spaced transversely extending cross members fixedly secured between said runners; front attaching means operatively associated with said main luggage rack frame for attaching the front of said main luggage rack frame to the roof of said vehicle; a rear extension extending rearwardly from said main luggage rack frame and when properly mounted about the roof of said vehicle said rear extension projects rearwardly from the vehicle roof towards and over said vehicle trunk like, said rear extension including a forward end portion that is telescopically associated with said runners of said main luggage rack frame; means for allowing said extension to be adjustably extended over the vehicle trunk lid relative to said main luggage rack frame, and wherein said rear extension includes a rear end portion that normally lies above the trunk lid; and trunk lid engaging the rear support means having one vertically adjustable post secured to the rear portion of said rear extension and extending generally downwardly therefrom with said trunk engaging rear support post means including a lower end that is adapted to engage and be secured to an upper surface area portion of said trunk lid of said vehicle such that the rear of said luggage rack is supported about the vehicle roof by said front attaching means and supported above the vehicle trunk lid by said trunk lid engaging rear support post means independently of said vehicle roof.

2. The vehicle luggage rack of claim 1 wherein said rear support post means includes a vertically support post adjustably secured to said rear extension and wherein said rear support post means includes a suction cup disposed about the lower end of said support post and adapted to be suctionally secured to a trunk lid overlying said vehicle trunk area.

3. The vehicle luggage rack of claim 2 including means for vertically adjusting said rear support post means with respect to said rear extension includes a collar fixed to said rear extension and having an opening therein for receiving said vertical support post; and wherein there is provided means for securing said vertical support post within said collar at various positions in order to adjust the luggage rack about the vehicle such that the luggage rack main frame and extension may be disposed in a generally horizontal position.

4. The luggage rack of claim 3 wherein the rear ends of said runners include an opening about the rear end of each; and wherein said rear extension includes a pair of laterally spaced arms each being adapted to be telescopically received within the openings about the rear of said runners.

5. The luggage rack of claim 4 wherein said rear extension includes a clevis and wherein said collar is secured to said clevis.

6. The vehicle luggage rack of claim 5 wherein said rear extension includes a frame having a generally arcuately shaped rear portion wherein the arms of said rear extension form a forward part of said frame.

7. The vehicle luggage rack of claim 6 wherein said front attaching means includes a pair of laterally spaced legs secured to a front cross member of said main luggage rack frame and extending therefrom, with each leg having a suction securing shoe secured to the lower portion thereof for engagement with the vehicle roof.

8. A vehicle luggage rack adapted to be secured atop the roof of a vehicle having a landau type roof, said vehicle luggage rack comprising: a main luggage rack frame having a pair of laterally spaced longitudinally extending runners with each runner having a rear opening defined about the rear end thereof, and wherein said main luggage rack frame includes a pair of longitudinally spaced transversely extending cross members fixed to said longitudinally extending runners; front attaching means secured to said main luggage rack frame and operative to attach the front of said luggage rack frame to the front of said vehicle roof; a rear extension frame telescopically connected to said main luggage rack frame and adjustable fore and aftly relative thereto, said rear extension frame including a generally arcuately shaped rear portion and a pair of arms disposed forwardly of said arcuately shaped rear portion and adapted to be telescopically received within respective openings of said runners; adjustable securing means associated with said main luggage rack frame for securing the arms of said rear extension frame within the rear openings of said runners of said main luggage rack frame; a clevis secured to said rear extension frame and projecting generally rearwardly therefrom over an area of the vehicle rearwardly of said roof referred to as a trunk area; a collar secured to said clevis and extending vertically therefrom and having a central opening defined therein; a rear support post generally confined within said collar and movable vertically therein; adjustable securing means associated with said collar for securing said vertical post in a desired position with respect to said collar; and a suction cup securing shoe disposed about the lower end of said vertical support post and adapted to engage the vehicle trunk in order that the vehicle luggage rack may project rearwardly from the vehicle roof over the trunk area of the vehicle and wherein said support post will act to support the luggage rack rearwardly of the roof and independent thereof.

* * * * *